J. HART.
RESILIENT TIRE.
APPLICATION FILED JAN. 6, 1911.
1,008,819.
Patented Nov. 14, 1911.
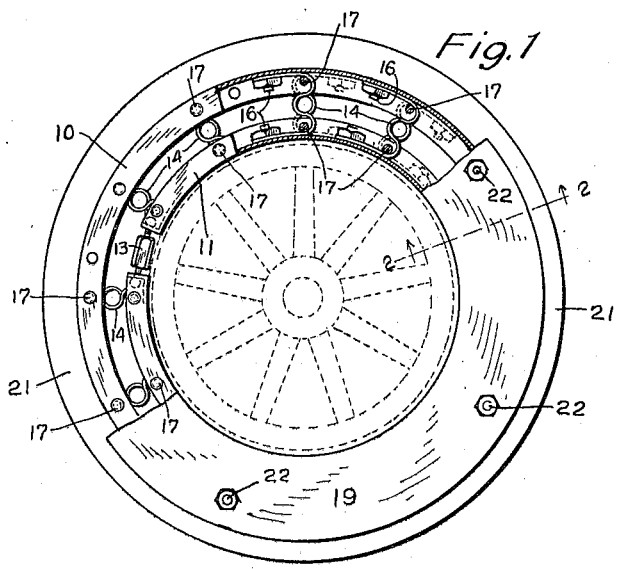
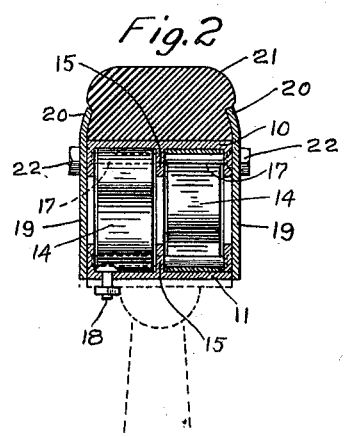
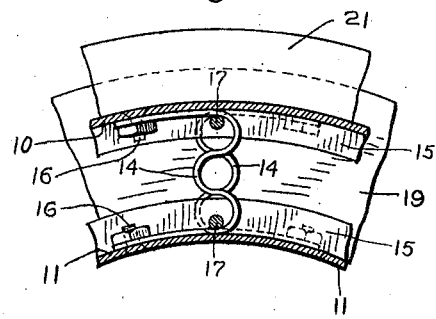
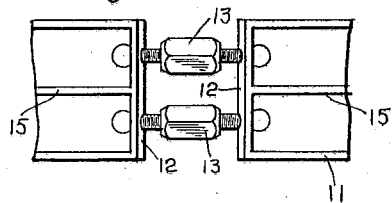
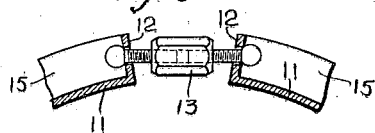
WITNESSES:
H. W. Meade
S. W. Atherton
INVENTOR
Josiah Hart
BY
A. M. Wooster
ATTORNEY

UNITED STATES PATENT OFFICE.

JOSIAH HART, OF BRIDGEPORT, CONNECTICUT, ASSIGNOR OF ONE-FIFTH TO HENRY L. LEWIS, OF STRATFORD, CONNECTICUT.

RESILIENT TIRE.

1,008,819. Specification of Letters Patent. Patented Nov. 14, 1911.

Application filed January 6, 1911. Serial No. 601,127.

*To all whom it may concern:*

Be it known that I, JOSIAH HART, a citizen of the United States, residing at Bridgeport, county of Fairfield, State of Connecticut, have invented an Improvement in Resilient Tires, of which the following is a specification.

This invention has for its object to provide a resilient demountable tire adapted for vehicle wheels generally and especially adapted for automobile wheels, which shall be simple in construction, relatively inexpensive to produce, durable and easy to repair and which shall have the yielding and easy riding qualities of a pneumatic tire.

With these and other objects in view I have devised the novel spring tire which I will now describe, referring to the accompanying drawing forming a part of this specification and using reference characters to indicate the several parts.

Figure 1 is an elevation partly broken away, illustrating my novel tire in place on a wheel; Fig. 2 a section on the line 2—2 in Fig. 1, looking in the direction of the arrows; Fig. 3 a detail longitudinal section on an enlarged scale, illustrating the construction of the tire; and Fig. 4 is a detail plan view and Fig. 5 a detail longitudinal section illustrating means for connecting the ends of the inner rim.

My novel tire comprises essentially inner and outer rims and a plurality of pairs or sets of double reverse curved springs, alternate springs in each set facing in opposite directions.

10 denotes the outer rim which is continuous and 11 a divided inner rim, the ends of which are provided with cross flanges 12 which are connected by means of turn buckles 13. In the present instance I have illustrated a tire having two lines or series of springs 14 arranged in pairs. The rims are provided with channels corresponding in number with the lines of springs. Two lines or series of springs are found to work admirably in practice but more may be used if preferred. For two lines of springs I use double channel rims; that is rims substantially E-shape in cross section, the outer rim facing inward and the inner rim facing outward. The springs are made of flat strips of metal, the operative portion of each spring being bent to the form of a double reverse curve, that is three half-circles, with the ends substantially parallel and extending in the same direction as the central curve. The springs of the sets or pairs are separated by means of the inner ribs or flanges, indicated by 15, of the rims. The ends of the springs are attached to the inner and outer rims respectively by bolts 16. Any number of pairs or sets of springs may be used, the springs of each pair being placed in transverse alinement with the central curves and the ends of the springs of each pair extending in opposite directions, as clearly shown in Fig. 3 which see in connection with Fig. 2. Each spring is supported at its first bend at each end by means of a cross bolt or rivet 17 which extends through the flanges of the rims, each bolt supporting an end of each spring in a pair or set. It is simply required that the wheel to which my novel tire is attached be provided with an ordinary felly or metal tire. To mount a tire it is simply necessary to loosen the turn buckles sufficiently to permit the inner rim of the tire to be passed over the wheel. The turn buckles are then tightened up to lock the tire in place. The tire is preferably additionally secured in place and creeping of the tire on the wheel is prevented by means of bolts 18 which pass through the inner rim and through the metal tire or felly of the wheel.

In order to prevent dirt from getting into the springs, I preferably provide side plates 19 which are secured to the outer rim, as by bolts 22, or if preferred the side plates may be secured in place by cross bolts 17. These side plates are made wide enough to cover or approximately cover both the inner and outer rims and may be extended outward beyond the outer rim to form clamps or grips, indicated by 20, to engage and retain a tread, indicated by 21, which may be made of any suitable material as wood, rubber, leather, cotton or metal. To demount a tire it is simply required to remove one of the side plates, the bolts 18 which secure the inner rim to the wheel and to loosen the turn buckles sufficiently to expand the inner rim and permit its removal from the wheel.

Having thus described my invention I claim:

1. A resilient tire comprising an inner circular rim having its outer face provided with a longitudinal flange, an outer circular rim having its inner face provided with a longitudinal flange disposed opposite the flange of the inner rim, springs each comprising a double reverse curve with ends extending in the same direction, said springs being interposed between said rims and arranged in pairs, means for securing the ends of the springs to the respective rims, the ends of the springs of each pair extending in opposite directions, a tread on the outer rim, side plates secured to said rim to cover said springs and project above the outer rim to secure said tread in position, and cross bolts connecting the flanges of each rim, each spring being supported at its first bend by one of said cross bolts.

2. A resilient tire comprising an inner circular rim having its outer face provided with a longitudinal flange, an outer circular rim having its inner face provided with a longitudinal flange disposed opposite the flange of the inner rim, both of said rims being provided with longitudinal side flanges, springs interposed between said rims and arranged in the spaces between said flanges, means for securing the ends of the springs to the respective rims, a tread on the outer rim, and side plates connected to said rims to cover said springs, said side plates projecting above the outer rim to secure said tread in position, and cross bolts connecting the flanges of each rim, each spring being supported at its first bend by one of said cross bolts.

3. A resilient tire comprising an inner circular rim having its outer face provided with longitudinal channels, an outer circular rim having its inner face provided with longitudinal channels disposed opposite the channels of the inner rim, springs each comprising a double reverse curve with ends extending in the same direction, said springs being interposed between said rims and arranged in pairs, the ends of the springs of each pair extending in opposite directions, means for securing the ends of the springs to the respective rim channels, cross bolts engaging each spring at the first bend thereof, a tread on the outer rim and side plates secured to said rims to cover said springs, said side plates projecting above the outer rim to secure said tread in position.

4. A resilient tire comprising inner and outer double channel rims, springs each comprising a double reverse curve with ends extending in the same direction, cross bolts in the rim supporting the first bends at the ends of the springs and side plates secured to the outer rims and inclosing the springs, a tread, and extensions of the side plates which clamp the tread.

5. A resilient tire comprising an inner circular rim, an outer circular rim, springs each comprising a double reverse curve with their ends extending in the same direction, said springs being interposed between said rims, means for securing the ends of the springs to the respective rims, a tread carried by the outer rim, and cross bolts connecting the flanges of each rim, each spring being supported at its first bend by one of said cross bolts.

In testimony whereof I affix my signature in presence of two witnesses.

JOSIAH HART.

Witnesses:
A. M. WOOSTER,
S. W. ATHERTON.

---

Copies of this patent may be obtained for five cents each, by addressing the "Commissioner of Patents, Washington, D. C."